L. GUDGELL.
RESILIENT WHEEL.
APPLICATION FILED MAY 11, 1917.
1,298,493.
Patented Mar. 25, 1919.
2 SHEETS—SHEET 1.
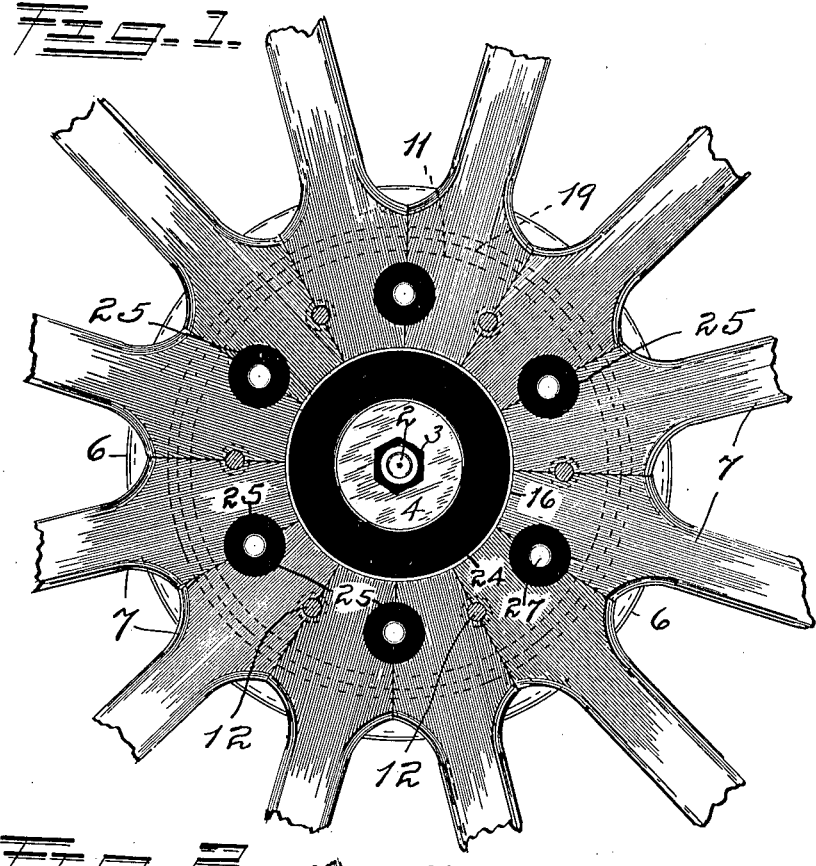
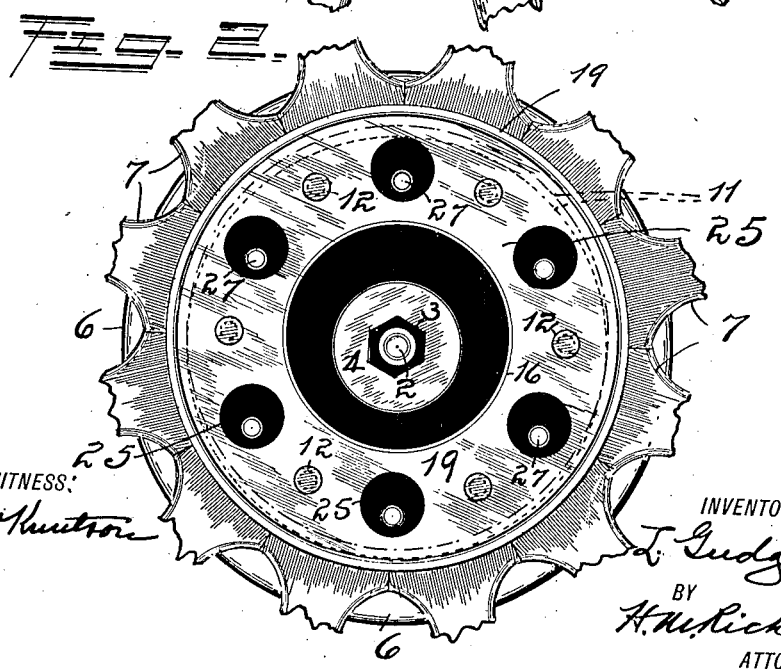
WITNESS:
INVENTOR:
L. Gudgell,
BY
H. W. Richards,
ATTORNEY.

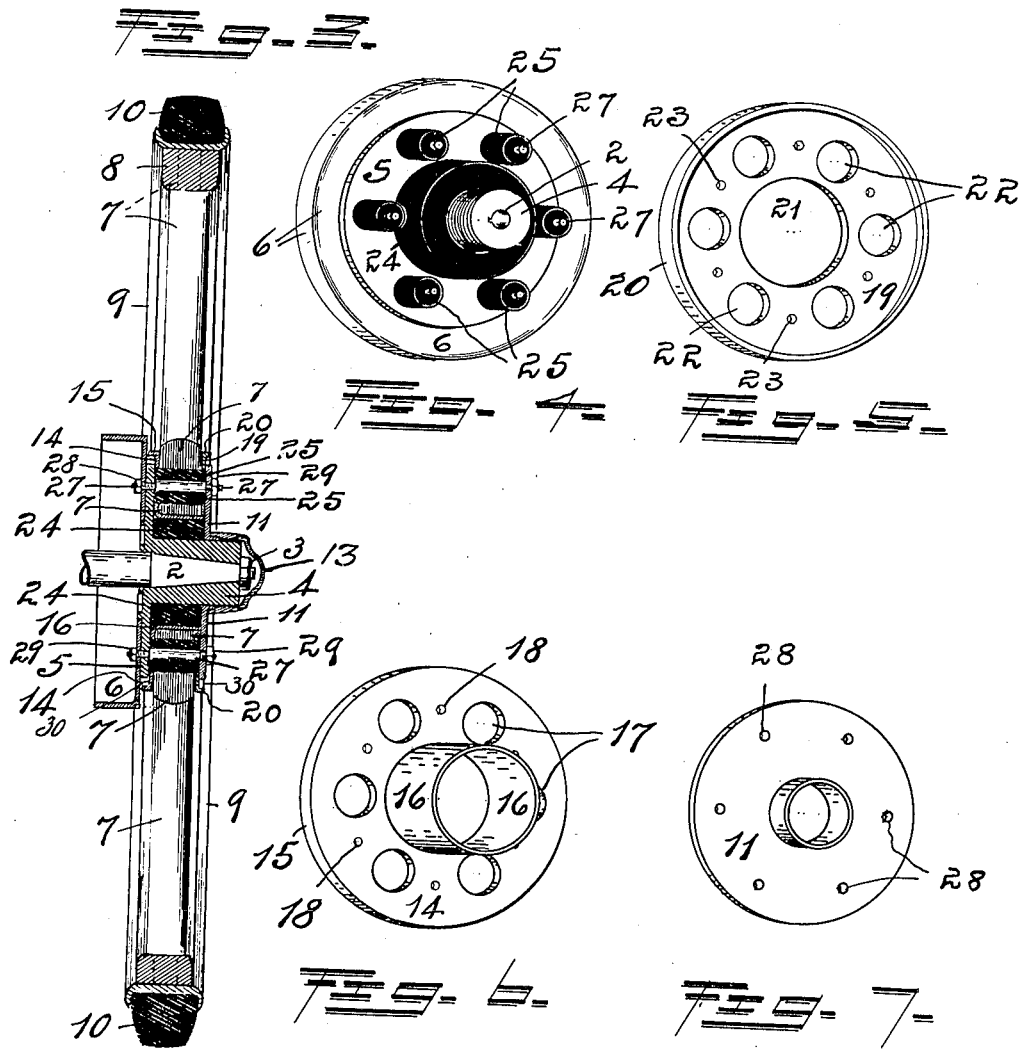

UNITED STATES PATENT OFFICE.

LYCURGUS GUDGELL, OF ROCK ISLAND, ILLINOIS, ASSIGNOR TO THE GUDGELL'S RUBBER HUB COMPANY, OF ROCK ISLAND, ILLINOIS, A CORPORATION.

RESILIENT WHEEL.

1,298,493.

Specification of Letters Patent.  Patented Mar. 25, 1919.

Application filed May 11, 1917.  Serial No. 167,958.

*To all whom it may concern:*

Be it known that I, LYCURGUS GUDGELL, a citizen of the United States, and a resident of Rock Island, in the county of Rock Island and State of Illinois, have invented a new and useful Resilient Wheel, of which the following is a specification.

My invention relates to vehicle-wheels and more particularly to the type employed in self-propelled vehicles.

One of the objects of the invention is to provide a wheel the hub of which embodies elasticity, and to combine this feature with a resilient tire, whereby the joint or co-ordinate action will produce a superior effect.

Another object is to provide for durability both as regards structure and effectiveness. Metal springs quickly begin to lose their resiliency. They frequently crystallize, and they frequently become broken. I therefore employ heavy rubber as the resilient elements of my improvements.

Other improvements consist in novel structural features, novel arrangements, and novel combinations.

Concisely stated, the principal end and object of the invention is to generally improve the construction and increase the capacity, utility and efficiency of wheels of this nature.

In the accompanying drawings, which illustrate a preferred embodiment of my invention:

Figure 1 is a face elevation of the central portion of a wheel, the cap-plate, cap and outer annulus removed;

Fig. 2, a similar view, but the outer annulus in position, showing the relative positions of the parts when weight is imposed upon the spindle and wheel and thereby on the resilient elements;

Fig. 3, a transverse central section;

Fig. 4, a perspective illustrating the mounting and arrangement of the resilient elements;

Fig. 5, a perspective detail of one of the spring-holding annuli;

Fig. 6, a similar view of the companion spring-holding annulus; and

Fig. 7, a perspective of the cap-plate.

Coming now to a detailed description of the drawings, and referring to the elements and, where necessary, to the parts thereof, each by a distinguishing reference numeral, uniformly employed, 2 indicates the spindle; 3 the retaining nut; 4 the hub; 5 the hub-flange; 6 the brake-ring; 7 the spokes; 8 the felly; 9 the rim; 10 the tire; 11 the cap-ring; 12 the spoke-securing rivets; and 13 the cap of an automobile or truck wheel of ordinary construction.

14 indicates the inner annulus, having a peripheral flange 15 and a centrally arranged spoke-bearing hub 16. It is provided also with an annular series of openings 17 and with rivet-holes 18. 19 designates the outer annulus, having a peripheral flange 20; a central opening 21, an annular series of openings 22, and a series of rivet holes 23.

24 indicates the main resilient element or spring of my improvements. It is provided with an axial opening which fits over the hub 4 and is held within the hub 16 of the annulus 14. 25, 25 denote the auxiliary resilient elements or springs, each provided with an axial opening which receives a bolt 27 projecting through the brake-ring 6, through the hub-flange 5, between a pair of spokes 7, through the annulus 19, and its constricted terminal through one of the holes 28 in the cap-ring 11. Each bolt is held in place by nuts 29.

I realize that without departing from the spirit of my invention considerable variation is possible in the details of construction; therefore I do not consider myself as limited to the specific structure shown nor to specific arrangements except as defined in the following claim, in which it is my intention to claim as broadly as is permitted by the state of the art all the novelty inherent in the invention.

Assume the elements to be assembled as shown in Fig. 3. When a load is placed upon the spindle, latter will bear downward on the wheel-hub 4 and thereby upon the hub-flange 5 and the cap-ring 11, and as the elements 5 and 11 are connected by the bolts 27 said ring will move with said flange. The rivets 12 unite the annuli 14 and 19 and pass also through or between the butts of the spokes 7, and as the hub 16 of the annulus 14 is contacted by the ends of the spokes it and both of said annuli will be supported by the spokes which are for the time being doing the supporting. Therefore, when a shock occurs, throwing the chassis downward, the spindle 2 will cause the hub 4 to bear upon the spring 24 and each bolt 27 will bear upon its respective coacting spring 25, the spindle, the hub 4, the brake-ring and the ring 11 thus moving independently of and relatively to the annuli 14 and 19, which latter, as above stated, are sustained by the spokes, the movement being indicated by the broken and dotted lines in Fig. 2, the former lines showing the normal position of the members 11 and the latter ones its position when the springs are compressed. At 30, Fig. 3, the flanges 15—20 are shown as spaced from the adjacent edges of the hub-flange 5 and ring 11 respectively, whereby the above described floating movement is permitted.

Having thus set forth the nature of my invention, I claim as new:

A resilient wheel structure comprising a spindle hub having a flange at one end thereof, a resilient spring member secured upon said spindle and abutting one face of the flange, an annulus having a spoke bearing portion slidably mounted upon said spindle hub and the spring member, a flange carried by said bearing hub and in engagement with said spindle hub, a second annulus slidable upon and over said spindle hub and spring member, a cap ring mounted on said spindle hub and engaging said second annulus, spokes arranged between the first and second annulus and having their inner ends resting upon said spring member and bolts extending through said spindle hub flanges first and second annulus flanges and the spokes and cap ring whereby the parts are held against displacement relative to one another.

In testimony whereof I hereunto sign my name this third day of May, 1917.

LYCURGUS GUDGELL.